(12) United States Patent
Poole et al.

(10) Patent No.: US 6,353,431 B1
(45) Date of Patent: Mar. 5, 2002

(54) SURFACE MOUNT POINTING DEVICE HAVING SIGNAL CONDITIONING COMPONENTS

(75) Inventors: David L. Poole, Jay; Robert M. Vandenboom, Wells, both of IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/541,972

(22) Filed: Apr. 4, 2000

Related U.S. Application Data

(63) Continuation-in-part of application No. 09/258,513, filed on Feb. 25, 1999.

(51) Int. Cl.$^7$ .................................................. G01L 1/22
(52) U.S. Cl. ...................................... 345/161; 345/168
(58) Field of Search ................................. 345/161, 168

(56) References Cited

U.S. PATENT DOCUMENTS

| | | | |
|---|---|---|---|
| 5,325,081 A | * | 6/1994 | Roberts .......................... 338/2 |
| 5,521,596 A | * | 5/1996 | Selker et al. .................. 341/22 |
| 5,767,840 A | * | 6/1998 | Selker .......................... 345/161 |
| 5,894,301 A | | 4/1999 | Seffernick |
| 6,002,388 A | | 12/1999 | Seffernick |
| 6,121,954 A | * | 9/2000 | Seffernick .................... 345/161 |
| 6,137,475 A | * | 10/2000 | Ginn et al. .................. 345/161 |

* cited by examiner

*Primary Examiner*—Bipin Shalwala
*Assistant Examiner*—Vincent E. Kovalick
(74) *Attorney, Agent, or Firm*—Mark P. Bourgeois; Mark W. Borgman

(57) ABSTRACT

A pointing stick for controlling cursor movement on a display screen of a computer system that is mountable to a surface of a printed circuit board. The pointing stick has a base member and a shaft having mounted in the base member. Several sensors are mounted around the shaft for sensing the amount of strain in the shaft that is created in response to an applied force on the shaft. The sensors generate an electrical signal in response to the applied force. A pair of spaced electrical leads are located on opposing sides of the base member and extend partially through the base member. Each of the electrical leads has several inner terminal ends that are electrically connected to the sensors. Several outer terminal ends extend outwardly of the base member and are shaped for mounting on the surface of a circuit board. An electronic component is attached to the shaft or the leads and is electrically connected to the inner terminal ends. The electronic component receives the electrical signal from the sensors as an input and generates a conditioned electrical signal as an output.

9 Claims, 10 Drawing Sheets

SURFACE MOUNT POINTING DEVICE HAVING SIGNAL CONDITIONING COMPONENTS

CROSS REFERENCE TO CO-PENDING AND RELATED APPLICATIONS

This invention is a continuation in part of U.S. patent application Ser. No. 09/258,513 filed on Feb. 25, 1999, entitled "Integrated Surface Mount Pointing Device", having a common assignee and a common inventor and is herein incorporated by reference in its entirety.

This application is related to the following applications which are herein incorporated by reference in their entirety for supportive and related teachings:

U.S. patent application Ser. No. 09/168,022, filed Oct. 7, 1998, titled "Pointing Stick Having Chip Resistors".

U.S. patent application Ser. No. 09/149,966, filed Sep. 9, 1998 is a pointing stick having integral control circuitry and has the same assignee as the present invention.

U.S. patent application Ser. No. 08/717,517, filed Sep. 23, 1996, now U.S. Pat. No. 5,894,301 is a collar mounted pointing stick and has the same assignee as the present invention.

U.S. patent application Ser. No. 08/938,274, filed Sep. 26, 1997 is a unified bodied z-axis pointing stick and has the same assignee as the present invention.

U.S. patent application Ser. No. 08/794,703, filed Feb. 4, 1997 is a z-axis pointing stick with ESD protection and has the same assignee as the present invention.

U.S. patent application Ser. No. 09/082,700, filed May 21, 1997 is a pointing stick having an interposer connecting layer and has the same assignee as the present invention.

U.S. patent application Ser. No. 09/149,713, filed Sep. 9, 1998, now U.S. Pat. No. 6,002,388 is a pointing stick having a flexible interposer and has the same assignee as the present invention.

BACKGROUND OF THE INVENTION

1. Field of the Invention

This invention generally relates to a pointing device for controlling the positioning, movement and operation of a cursor on a display screen associated with a computer and, more particularly, to an integrated pointing device that is mountable to a printed circuit board.

2. Description of the Related Art

Various devices are well known for controlling cursor movement over a display screen associated with a computer. Depending on the type of computer program in operation, the position of the cursor on a display screen may indicate a choice of computer commands on a menu associated with the computer program displayed on the display screen menu. One such device is a "mouse" which has a ball mounted to its underside for contacting a horizontal surface and rolling therealong when manipulated by a computer operator. The X- and Y-axis components of movement are sensed and transmitted through a connecting cable to a serial input port of the computer. This signal to the computer is varied by the amount and direction of mouse ball movement, and causes a corresponding movement of the cursor on the display screen. Typically a pair of "mouse" or "click" buttons are located on the top of the mouse at the forward end thereof. The buttons permit a computer operator to enter a selection or other command to the computer (the command typically being shown by the position of the cursor on the displayed menu) upon pressing one or the other or both buttons, depending upon the software associated with the mouse. Such a device, which is separate from the computer console and keyboard, requires a connection to a computer port and a flat, horizontal supporting surface for proper operation. Furthermore, the computer operator must completely remove one hand from the computer keyboard in order to move the mouse and thus the cursor on the display screen and then reposition the hand again over the keys of the keyboard to resume data entry.

Another cursor controlling and signaling mechanism is a "joystick" which, like the mouse, is completely separated from the computer console and keyboard. The joystick is typically an elongated, upright stick that extends upwardly from a base connected to the computer console by means of an electrical cable. The joystick is operated by tilting the upright stick in various directions to cause the cursor or other display element to move on the display screen in a direction and usually at a speed corresponding to the direction and pressure exerted on the stick by the computer operator. The operation of a joystick, however, frequently requires that both hands be moved from the computer keyboard, with one hand holding the base and the other hand manipulating the joystick. A "click" button is usually located on the joystick. Although a mouse or joystick can be used with a portable "laptop" or "notebook" sized computer, such devices are cumbersome, since they must be carried separately and connected to the computer before use. Moreover, such devices are not suitable for operation during travel.

A "trackball" is still another type of known cursor controlling device. This device, which in essence is an inverted mouse, includes a rotatable ball mounted within a housing. The ball is rotated by a finger, thumb or palm of the computer operator, and the X- and Y-components of movement are sensed and input into the computer with corresponding movement of the cursor across the display screen. "Mouse" or "click" buttons are usually located on the trackball housing, although with some models a selection signal is input by pressing the "enter" key on the standard keyboard. This type of pointing device has been somewhat useful with portable computers because it can be temporarily affixed to one side of the computer case for manipulation by one hand of the computer operator. However, although trackball devices can be removably mounted to the computer case, they still required attachment before use and removal after use and repositioning of the computer operator's hand during use. It is also noted that some trackball's are built into the computer keyboard. Nonetheless, these trackball's required a separate set of "click" buttons for selection of items on the display monitor.

Manufacturers of portable laptop computers, recognizing the need for placing the cursor controlling device in a permanent and more convenient location, have more recently installed a small, stubby button-like joystick at a central position on the computer keyboard, such as at the juncture of the "g," "h" and "b" keys of the standard "QWERTY" keyboard. The button-like joystick, also known as a pointing stick, is sensitive to lateral pressure, the amount and direction of which are sensed and input into the computer to cause movement of the cursor, with the speed and direction of cursor movement corresponding to the amount and direction of pressure on the pointing stick. In order to select items on the display screen, upwardly extending "mouse" or "click" buttons must be provided somewhere on the computer, typically at a location remote from the pointing stick. This, as with the previously described cursor control devices, is disadvantageous since the hand and fingers of the computer operator must be repositioned in order to actuate the buttons and then be moved again to the proper keyboard position for typing.

Another disadvantage associated with a keyboard-mounted pointing stick is that a communication cable must extend from the pointing stick to a circuit board that provides a power source, amplifiers, and calibration electronics for the pointing stick. The circuit board is spaced from the pointing stick and care must be exercised when installing the cable therebetween. Moreover, the materials that make up the cable, its process of forming and method of attachment to the pointing stick contribute to increased overall cost of the pointing stick.

Examples of patents related to the present invention are as follows, wherein each patent is herein incorporated by reference for related and supporting teachings:

U.S. Patent No. Re. 5,956,018 discloses a compact pointing control stick circuit board assembly having electrical vias.

The foregoing patents reflect the state of the art of which the applicant is aware and are tendered with the view toward discharging applicants' acknowledged duty of candor in disclosing information that may be pertinent in the examination of this application. It is expressly stipulated, however, that none of these patents teach or render obvious, singly or when considered in combination, applicants' claimed invention.

SUMMARY OF THE INVENTION

It is a feature of the present invention to provide a pointing stick for controlling cursor movement on a display screen of a computer system.

It is a further feature of the present invention to provide an pointing stick device for controlling cursor movement on a display screen of a computer system that is mountable to a surface of a circuit board.

Another feature of the present invention is to provide a surface-mount pointing device for controlling the movement of an object on a display screen that includes a base member and a shaft having a first end and a second end. The first end mounted in the base member. Several sensors are mounted around the shaft for sensing the amount of strain in the shaft that is created in response to an applied force on the shaft in at least a first direction. The sensors generate an electrical signal in response to the applied force. A pair of spaced electrical leads are located on opposing sides of the base member and extend at least partially through the base member. Each of the electrical leads has several inner terminal ends that are electrically connected to at least one of the sensors. Several outer terminal ends extend outwardly of the base member and are shaped for mounting on the surface of a circuit board. One or more electronic components are attached to the first end of the shaft and are electrically connected to one of the inner terminal ends. The electronic component receives the electrical signal from the sensors as an input and generates a conditioned electrical signal as an output.

There has thus been outlined the more important features of the invention so that the detailed description thereof that follows may be better understood, and so that the present contribution to the art may be better appreciated. There are, of course, additional features of the invention that will be described hereinafter which will form the subject matter of the appended claims. Those skilled in the art will appreciate that the preferred embodiment may readily be used as of basis for designing other structures, methods and systems for carrying out the several purposes of the present invention. It is important, therefore, that the claims are regarded as including such equivalent constructions since they do not depart from the spirit and scope of the present invention.

It is noted that the drawings of the invention may not necessarily be to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENTS

Figure 1:
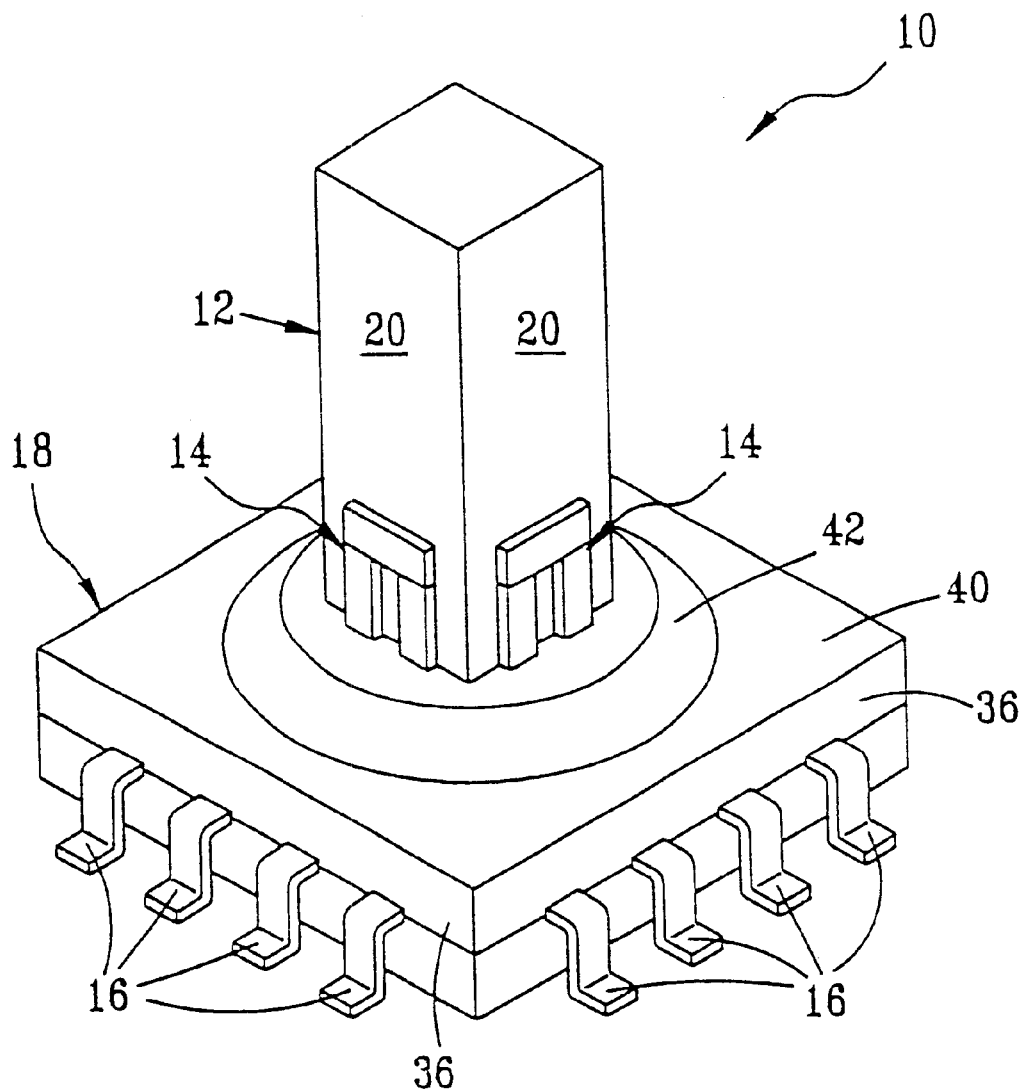
FIG. 1 is an isometric view of an integrated surface-mount pointing device according to a first embodiment of the invention.
Figure 2:
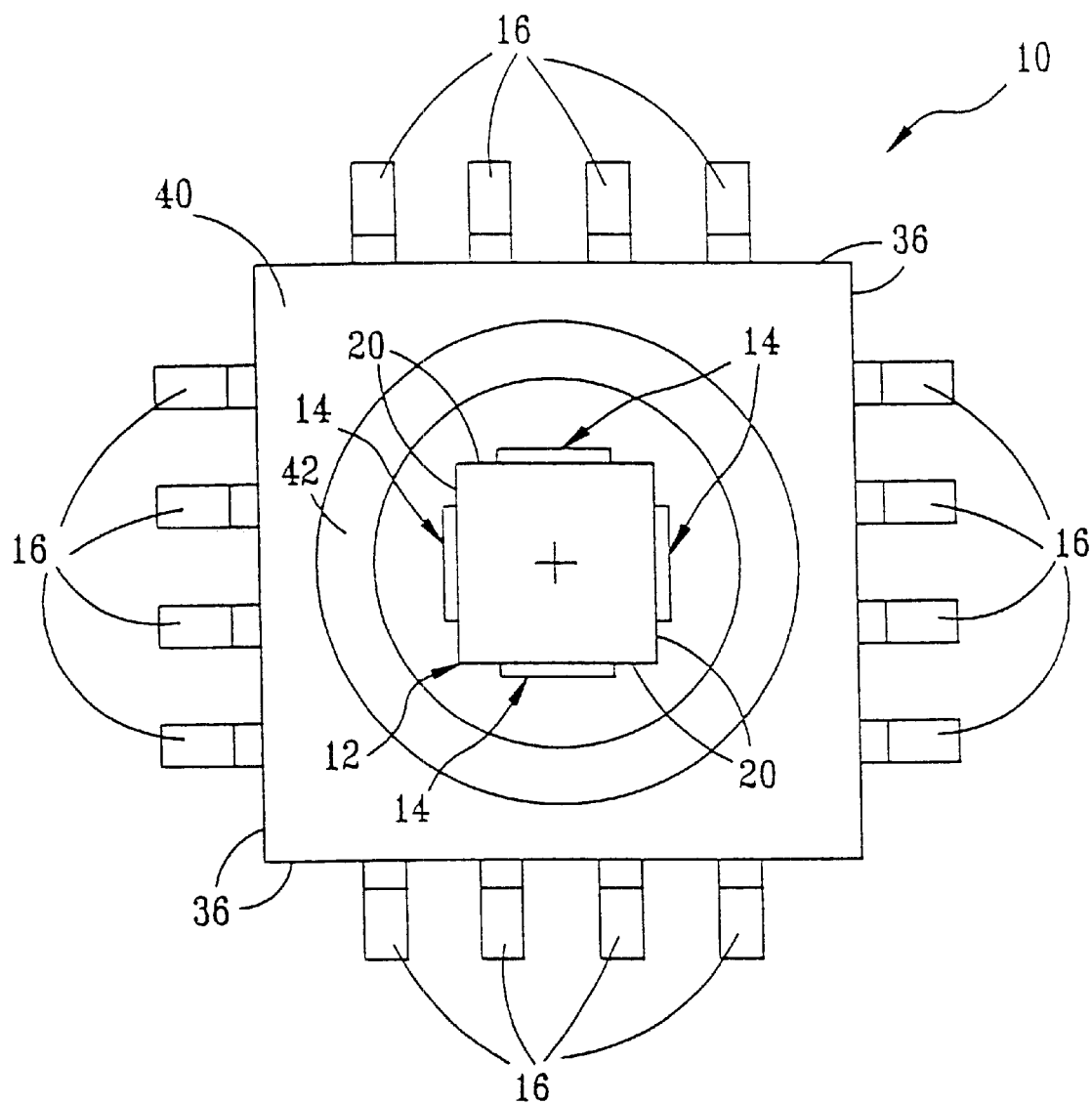
FIG. 2 is a top plan view of the integrated pointing device of FIG. 1.

With reference now to the drawings, and to FIGS. 1 and 2 in particular, an integrated surface-mount pointing device 10 that can be used to control the movement of a cursor on a computer screen (not shown) is illustrated. In particular, the pointing device 10 comprises an upright pointing stick or shaft 12, strain gauge sensors 14 located on the sides 20 of the stick 12, outer terminals 16 electrically connected with the strain gauge sensors 14, and a body 18 for supporting the stick 12 and the outer terminals 16.

Figure 3:
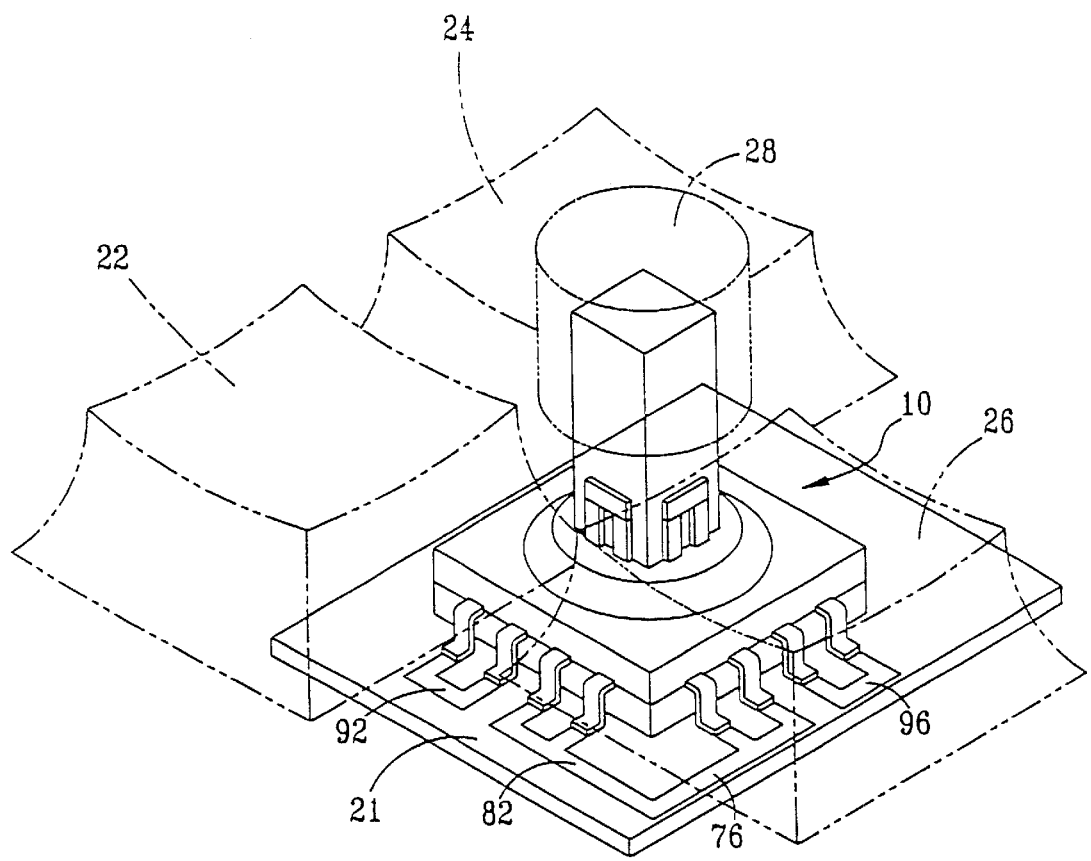
FIG. 3 is an isometric view of the integrated pointing device mounted on a computer keyboard.

As shown in FIG. 3, the pointing device 10 is surface-mounted on a printed circuit board 21 using well-known techniques. The circuit board 21 is in turn installed in a typing keyboard having a plurality of keys, such as keys 22, 24 and 26 (shown in phantom line) representative of letters, numerals, and/or symbols. Preferably, the keyboard is of the standard "QWERTY" type and the circuit board is mounted in the keyboard at a location such that the pointing stick 12 is positioned at the juncture between the "G" key 22, the "H" key 24, and the "B" key 26. Although this is the preferred location for the stick 12, it is to be understood that the pointing device 10 can be mounted at other locations, either on or off the keyboard. A resilient cap 28 (shown in phantom line), which may be formed of rubber-like material, is positioned over the top of stick 12 to increase the ease of operating the stick. The cap is sized to receive a single finger of an operator for controlling cursor movement on a computer screen in response to pressure exerted against the cap (and consequently the stick 12) in a desired cursor direction. The finger pressure causes strain in the stick 12 that is sensed by the strain gauges 14.

Referring again to FIGS. 1 and 2, the pointing stick 12 may be constructed of electrically insulative material, such as alumina or other ceramic. In the embodiment illustrated, the stick 12 is substantially square in cross section and formed with four side surfaces 20 for receiving the strain gauges 14. Although alumina is the preferred material for the pointing stick 12, it is contemplated that other suitable materials, such as plastics, epoxy resin, metals, or the like, can be used.

Figure 4:
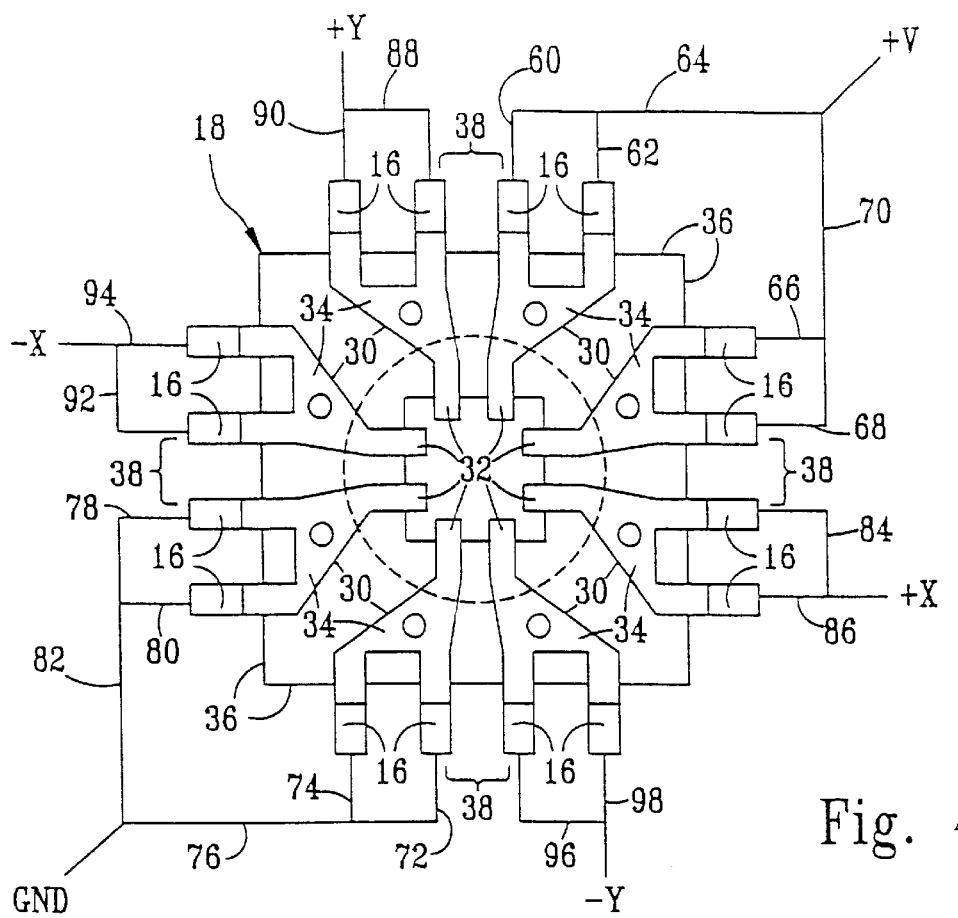
FIG. 4 is a cross sectional plan view of the integrated pointing device of FIG. 1 with the pointing stick removed for clarity.
Figure 5:
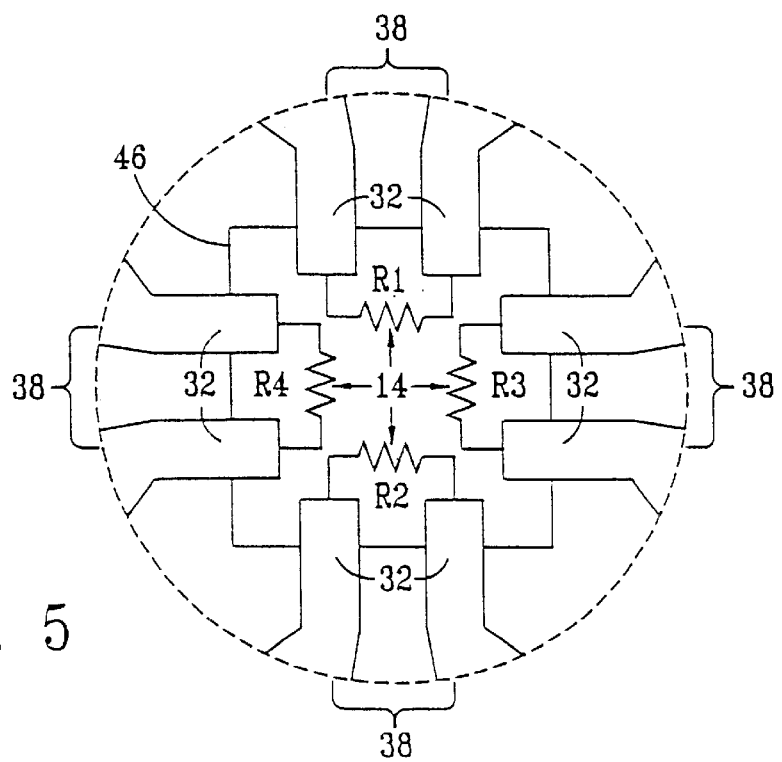
FIG. 5 is an enlarged cross sectional view within the dashed circle of FIG. 4.

With additional reference to FIGS. 4 and 5, the outer terminals 16 are formed in pairs on a lead 30. Each lead 30 comprises one pair of outer terminals 16 and an inner terminal 32 connected by a middle section 34. Each of the inner terminals preferably extends into an opening 46 in the body 18, but can terminate at the edge of the opening or proximal thereto. Preferably, eight leads 30 are arranged around a central axis of the body 18, with a pair 38 of leads 30 arranged on each side 36 of the body 18 such that four outer terminals 16 project outwardly and downwardly from each side. The leads 30 in each lead pair 38 are preferably mirror images of each other. Arrangement of the leads 30 in this fashion offers several advantages. Since only the outer terminals 16 are in contact with the printed circuit board (PCB), the number of outer terminals 16 is related to the holding strength of the device 10 on the PCB 21. A larger number of outer terminals permits the use of smaller and thinner leads and increased holding strength than if fewer terminals are used. Consequently, greater resistance to separation of the pointing device 10 from the PCB 21 is realized, especially during operation of the pointing stick 12 where forces may be generated in the X, Y and Z axes, or any combination thereof. The symmetrical orientation of the outer terminals 16 contributes to symmetrical loading along these axes when the pointing stick 12 is operated and facilitates alignment of the pointing device 10 with the printed circuit board during the mounting operation. With the use of smaller and thinner leads, the outer terminals 16 can be formed with a relatively small bending radius to thereby form a relatively small footprint for the pointing device 10. The leads may initially be pre-formed in their proper orientation as part of a lead frame (not shown) for facilitating automatic assembly of the integrated pointing device 10. Although four outer terminals 16 are shown on each side 36 of the body 18, more or less outer terminals may be formed, depending on the number of strain gauges 14, the amount of holding strength desired, and so on.

The outer terminals 16 of the leads 30 are shown in FIG. 1 with a gull-wing shape, but may be formed into any shape so as to be attachable to a printed circuit board, including, but not limited to J-lead, thru-hole and butt terminal shapes.

Figure 6:
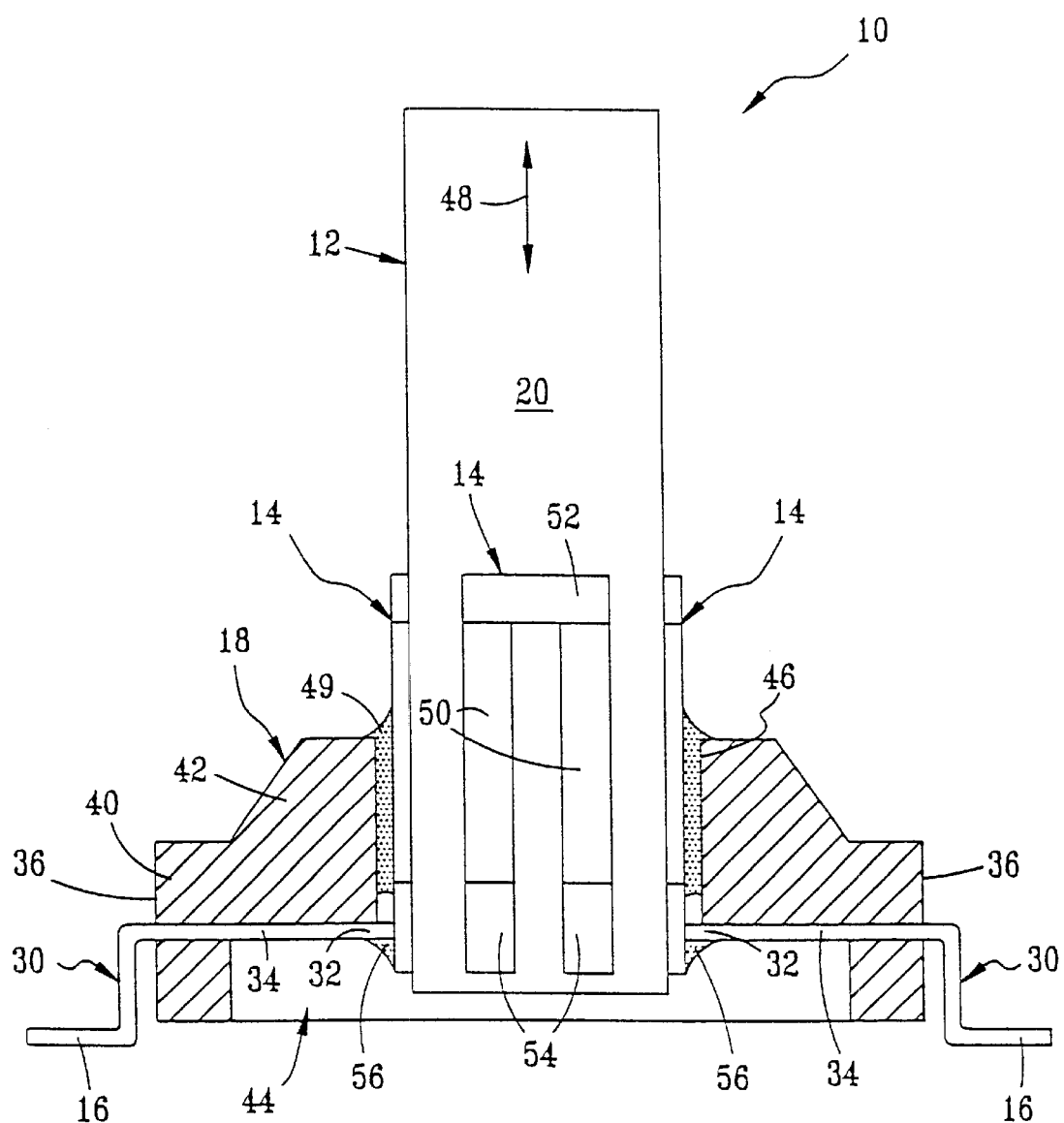
FIG. 6 is a cross sectional elevation view of the integrated pointing device of FIG. 1.

With reference now to FIG. 6, the body 18 comprises a base 40 and a collar 42 integrally formed with the base, although the collar may be formed separately and attached to the base through suitable adhesives, ultrasonic welding, or other well known bonding techniques. The base 40 is preferably generally square-shaped with four sides 36 and includes a cavity 44 formed in the base. The body 18 is preferably constructed of plastic material and the base 40 is molded around the middle section 34 of the leads 30 during an insert-molding process. Alternatively, the base 40 may be constructed of separate plastic sheet material bonded together with the leads 30 sandwiched therebetween. An opening 46 extends through the collar 42 and base 40 and is in communication with the cavity 44. The pointing stick 12 extends through the opening 46 in a Z-axis direction 48, and is held in place by a suitable adhesive material 49, such as a cyanoacrylate adhesive epoxy material. The particular adhesive used should be compatible with the materials of the pointing stick 12 and body 18.

The strain gauges 14 are mounted on the sides 20 of the stick 12. Each strain gauge comprises spaced pressure sensitive strips 50 that extend generally parallel to each other in the Z-axis direction 48, a conductive contact bridge 52 extending between the strips 50 at their upper end for electrically connecting the two strips 50, and a conductive contact pad 54 electrically connected to a lower end of each strip 50. Preferably, the conductive contact pads 54 are formed as lower extensions of the pressure sensitive strips 50.

The pressure sensitive strips 50 are formed of a material that exhibits a change in electrical properties, such as resistance, in response to the amount of strain applied thereto. Preferably, a resistive thick film material is screen printed onto the sides 20 of the pointing stick 12. Alternatively, a resistive thin film material can be sputtered onto the sides 20. The conductive bridge 52 and pad 54 are also adhered to the sides 20 in a well-known or similar manner.

With reference to FIGS. 5 and 6, leads 30 of a lead pair 38 are electrically connected to opposite ends of one of the strain gauges 14 (represented as R1, R2, R3 and R4 in FIG. 5) at their inner terminals 32, wherein a connected pair of strips 50 represents a single strain gauge 14. Each contact pad 54 is bonded to an aligned inner terminal 32 by any suitable bond material 50, such as tin-lead solder. In this manner, the outer terminals 16 are electrically connected to the strain gauges 14.

Since there are four outer terminals 16 associated with each strain gauge 14 in this embodiment, the printed circuit board 21 is formed with electrical traces that interconnect selected pairs of outer terminals 16. For example, as shown in FIGS. 4 and 5, traces 60 to 70 electrically connect one end of strain gauges R1 and R3 to a positive voltage source, while traces 72 to 82 electrically connect one end of strain gauges R2 and R4 to ground. Likewise, traces 84 and 86 connect the opposite end of strain gauge R3 to indicate strain in the positive X-axis direction; traces 88 and 90 connect the opposite end of strain gauge R1 to indicate strain in the positive Y-axis direction; traces 92 and 94 connect the opposite end of strain gauge R4 to indicate strain in the negative X-axis direction; and traces 96 and 98 connect the opposite end of strain gauge R2 to indicate strain in the negative Y-axis direction.

Figure 7:
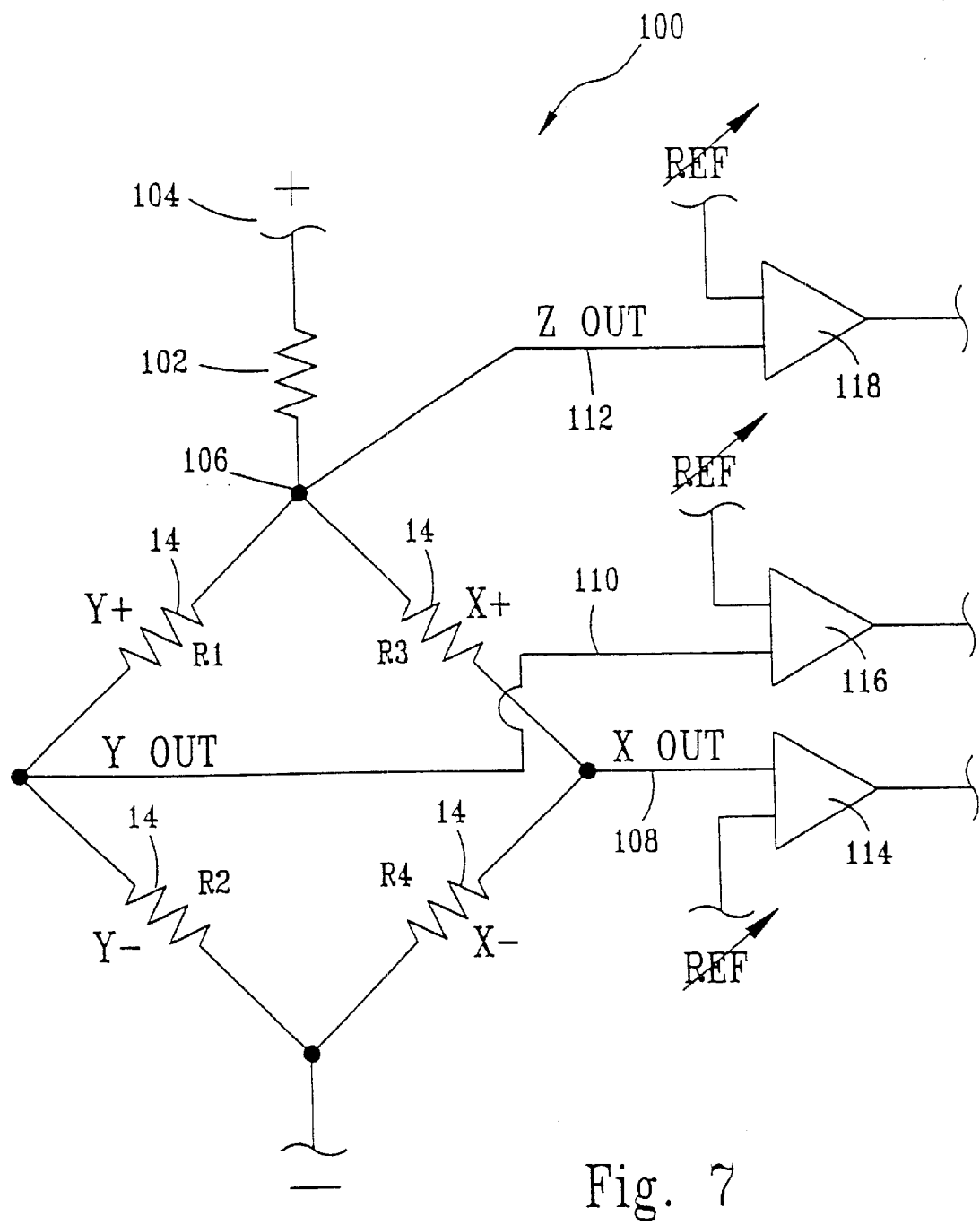
FIG. 7 is an electrical schematic of a bridge circuit incorporating the strain sensitive elements of the integrated pointing device.

Referring now to FIG. 7, an electrical schematic 100 of a bridge circuit incorporating the strain gauges 14 is shown. Specifically, this circuit is an example of how the Z-axis pointing stick can be arranged to interface with the electronics (not shown) on the circuit board 21. The strain gauges 14 on opposing sides of the stick 12 are configured in two half bridge circuits, resistors R1 (Y+) and R2 (Y−) form a first half bridge, while resistors R3 (X+) and R4 (X−) form the second half bridge. A fixed resistor 102 is connected between the supply voltage 104 of the system and a node 106. The X OUT output 108, Y OUT output 110, and Z OUT output 112 are amplified by three differential amplifiers 114, 116, and 118, respectively. Each amplifier has a variable reference voltage input. These reference voltages are calibrated to set the output to zero along each axis when no force is applied to the stick 12. The X and Y axis outputs 116 and 118 are developed when an X or Y directional force is applied to the stick 12. For example, when a force is applied in the X direction, the X- and X+ strain sensitive resistors change resistance in opposite directions and cause an output change. The same is true for the Y-axis. A Z-axis output is developed when a Z-axis force is applied to the top of the stick 12. Force in the Z-axis causes all strain gauge resistors 14 on the stick 12 to change in a negative direction. This change lowers the total impedance of the two half bridges. The lower bridge impedance causes a voltage change in the Z OUT output 112 since the series resistor 102 is fixed.

Figure 8:
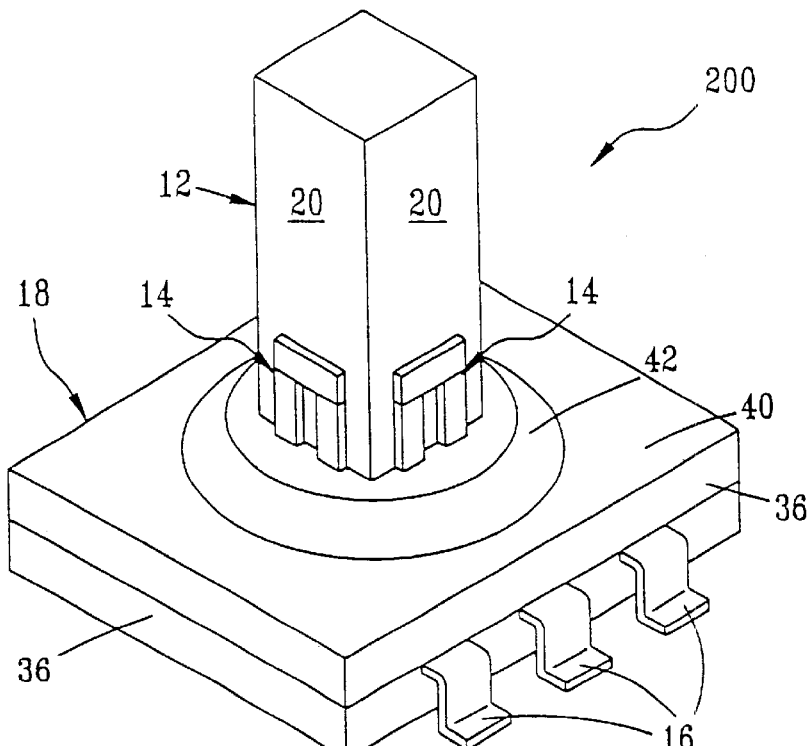
FIG. 8 is an isometric view of an integrated surface-mount pointing device according to a second embodiment of the invention.
Figure 9:
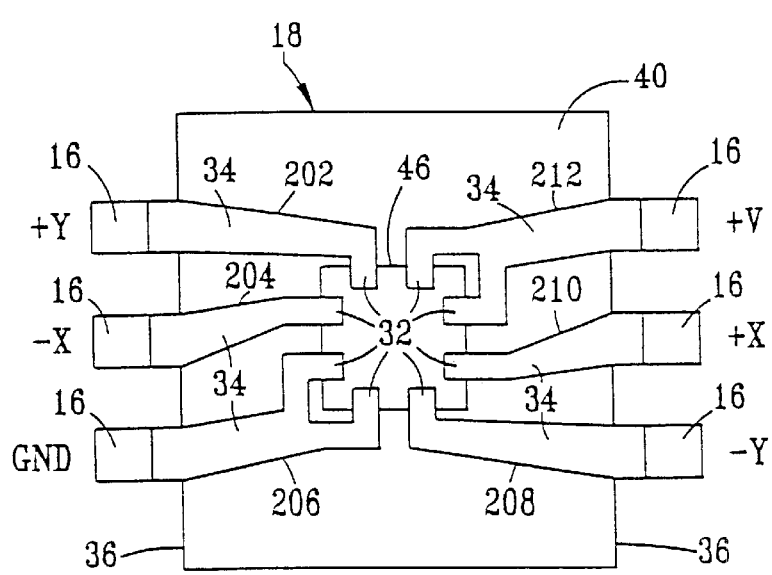
FIG. 9 is a cross sectional plan view of the integrated pointing stick of FIG. 8.

With reference now to FIGS. 8 and 9, an integrated surface-mounted pointing device 200 according to a further embodiment of the invention is illustrated, wherein like parts in the previous embodiment are represented by like numerals. As in the previous embodiment, the pointing device 200 comprises an upright pointing stick or shaft 12, strain gauges 14 located on the sides 20 of the stick 12, and a body 18 with a collar 42 and base 44. A total of six leads 202 to 212 are molded into the base 44. Each of the leads 202, 204, 208 and 210 comprises an outer terminal 16 and an inner terminal 32 separated by a middle section 34, while the leads 206 and 212 comprises an outer terminal 16 and a pair of inner terminals 32. Each of the inner terminals preferably extends into the opening 46 in the body 18, but can terminate at the edge of the opening or proximal thereto. Three leads 202, 204 and 206 are arranged on one side of the body 18, while the remaining leads 208, 210 and 212 are arranged on the opposite side of the body 18.

The connection of the leads to the strain gauges 14 is similar to that shown in FIG. 5, with the exception that the lead 212 is connected between a positive voltage source and one end of strain gauges R1 and R3 through its pair of inner terminals 32, and the lead 206 is connected between ground and one end of strain gauges R2 and R4 through its pair of inner terminals 32. Likewise, the lead 210 is connected to the opposite end of strain gauge R3 to indicate strain in the positive X-axis direction; the lead 202 is connected to the opposite end of strain gauge R1 to indicate strain in the positive Y-axis direction; the lead 204 is connected to the opposite end of strain gauge R4 to indicate strain in the negative X-axis direction; and the lead 208 is connected to the opposite end of strain gauge R2 to indicate strain in the negative Y-axis direction. With this arrangement, the separate traces on the circuit board of the previous embodiment, as schematically represented in FIG. 4, can be eliminated. The electrical schematic as shown in FIG. 7 can remain the same for this embodiment.

Figure 10:
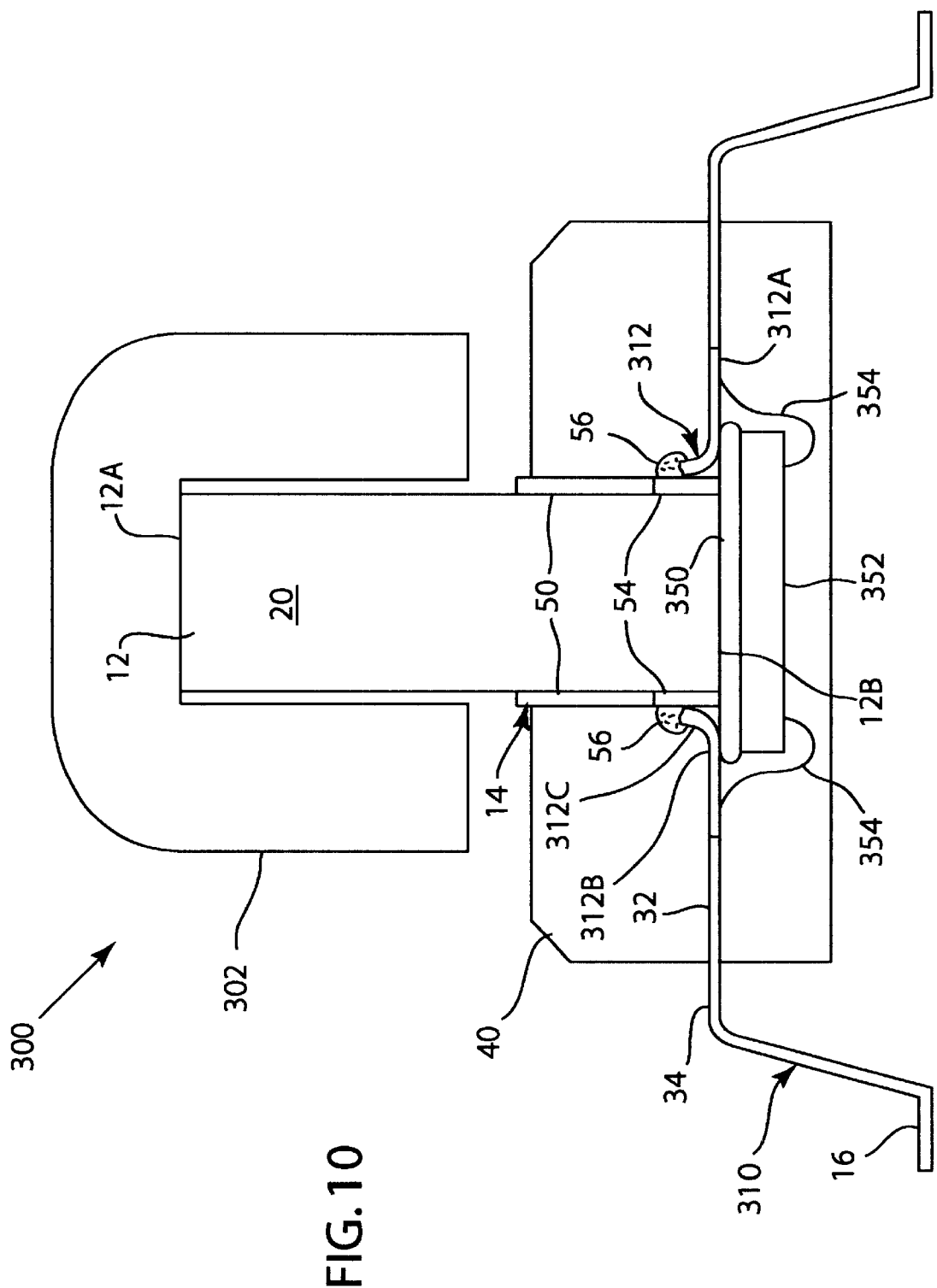
FIG. 10 is a side cross-sectional view of a surface mount pointing stick having a control circuit mounted on the package.
Figure 11:
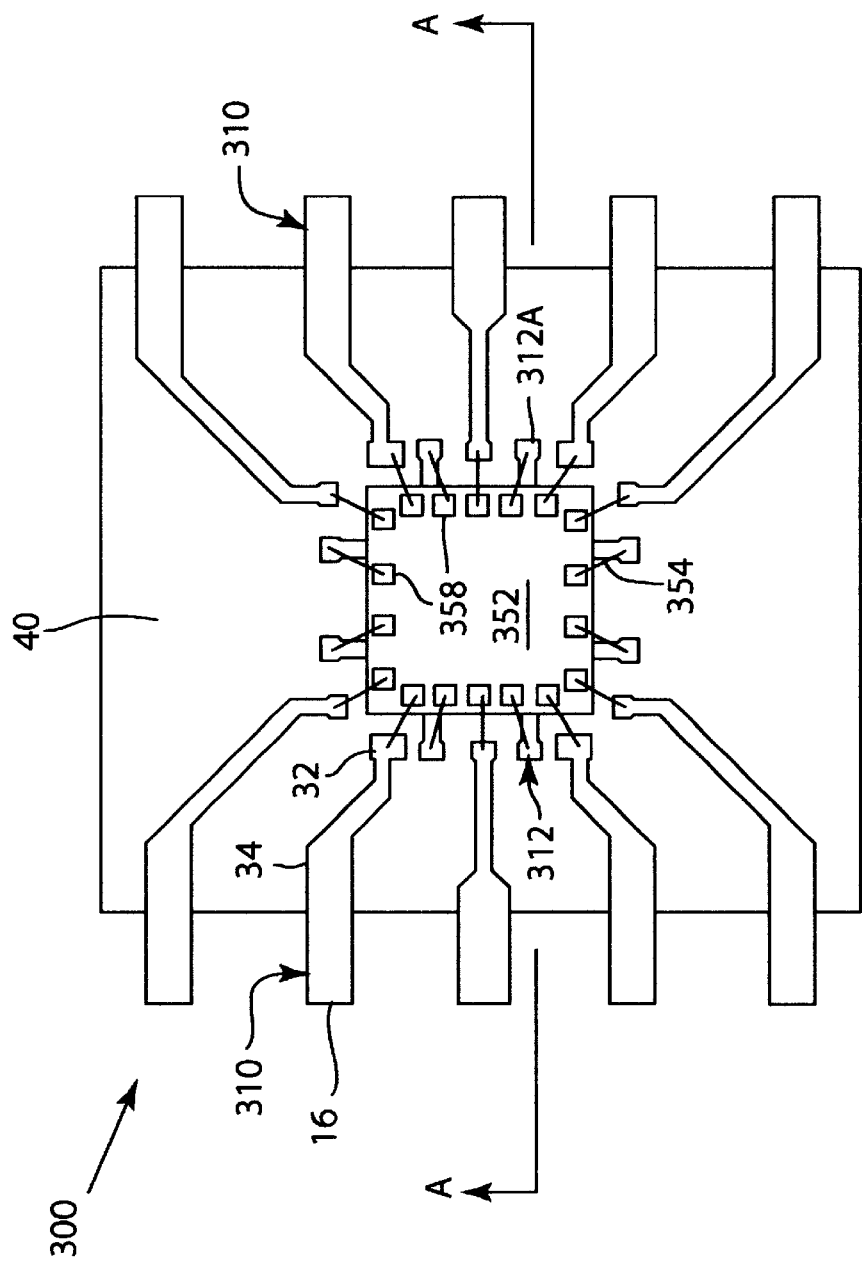
FIG. 11 is a bottom view of FIG. 10 with part of the housing removed to show the control circuitry mounted.

Referring to FIGS. 10 and 11, a surface-mount pointing stick having signal conditioning circuitry assembly 300 according to a further embodiment of the invention is illustrated, wherein like parts in the previous embodiment are represented by like numerals. As in the previous embodiment, the pointing stick 300 comprises an upright pointing stick or shaft 12, strain gauges 14 located on the sides 20 of the stick 12 with resistors 50 and contact pads 54. Stick 12 has an upper end 12A and a lower end 12B. A soft cap 302 covers stick 12. A plastic molded base 40 is located around shaft 12. A total of eight gull wing shaped outer metal leads 310 are molded into the base 40. Each of the leads 310 has an outer terminal 16 and an inner terminal 32 connected by a middle section 34. Outer terminals 16 are adapted to mount to a surface mount printed circuit board. A total of eight inner leads 312 are also molded into base 40. Inner leads 312 are short and are contained within base 40. Inner leads 312 has an curved end 312C, a middle part 312B and a bond pad end 312A. Curved end 312C curves up into contact with pad 54 and is attached to pad 54 by a solder joint 56. Solder joint 56 makes and electrical connection between pad 54 and lead 312. Four of outer leads 310 are arranged on one side of the base 40, while the remaining four outer leads 310 are arranged on the opposite side of the base 40. Inner leads 312 are placed two on each side of stick 12.

A conventional semiconductor die attach adhesive 350 is used to attach an integrated circuit semiconductor chip or die 352 to the lower end 12B of stick 12. The die 352 may also overlap with the adhesive 350 onto the bottom side of middle part 312B. A conventional ultrasonic gold or aluminum wire bond 354 is used to electrically attach wire bond pad 358 on die 352 to bond pad end 312A. Integrated circuit 352 contains signal conditioning circuitry that is able to accept an analog signal indicative of force and direction from the resistors 50 as an input and provide as an output a conditioned electrical signal. Such a conditioned signal could be an amplified signal and one that is converted into a digital format by an analog to digital converter. An integrated circuit performing such functions is available from Philips corporation and is called Trackpoint. The input signal is provided to die 352 by leads 312 and the output signal is placed on some of leads 310. Power and ground voltages would also be supplied to integrated circuit 352 by some of leads 310.

Surface-mount pointing stick having signal conditioning circuitry 300 is assembled in the following manner: The eight leads 310 and 312 are contained or held together by a lead frame (not shown) that is fabricated in a continuous reel by stamping or chemical etching. The stick 12 is placed into leads 312 and between curved ends 312C and dipped into molten solder form solder joint 56. Next, the die adhesive 350 is dispensed onto stick bottom 12B and die 352 is place onto adhesive 350. Adhesive 350 is then cured. A conventional wirebond machine applies an ultrasonic gold or aluminum wire bond 354 between pad 358 and inner terminal end pad 312A or inner terminal 32. The lead frame is removed from the reel. Next, base 40 is molded over die 352, leads 310, 312 and the lower half of stick 12. The leads are formed into a gull wing shape after the molding process. Last, cap 302 is applied over stick 12. If desired assembly 300 can be tested.

Figure 12:
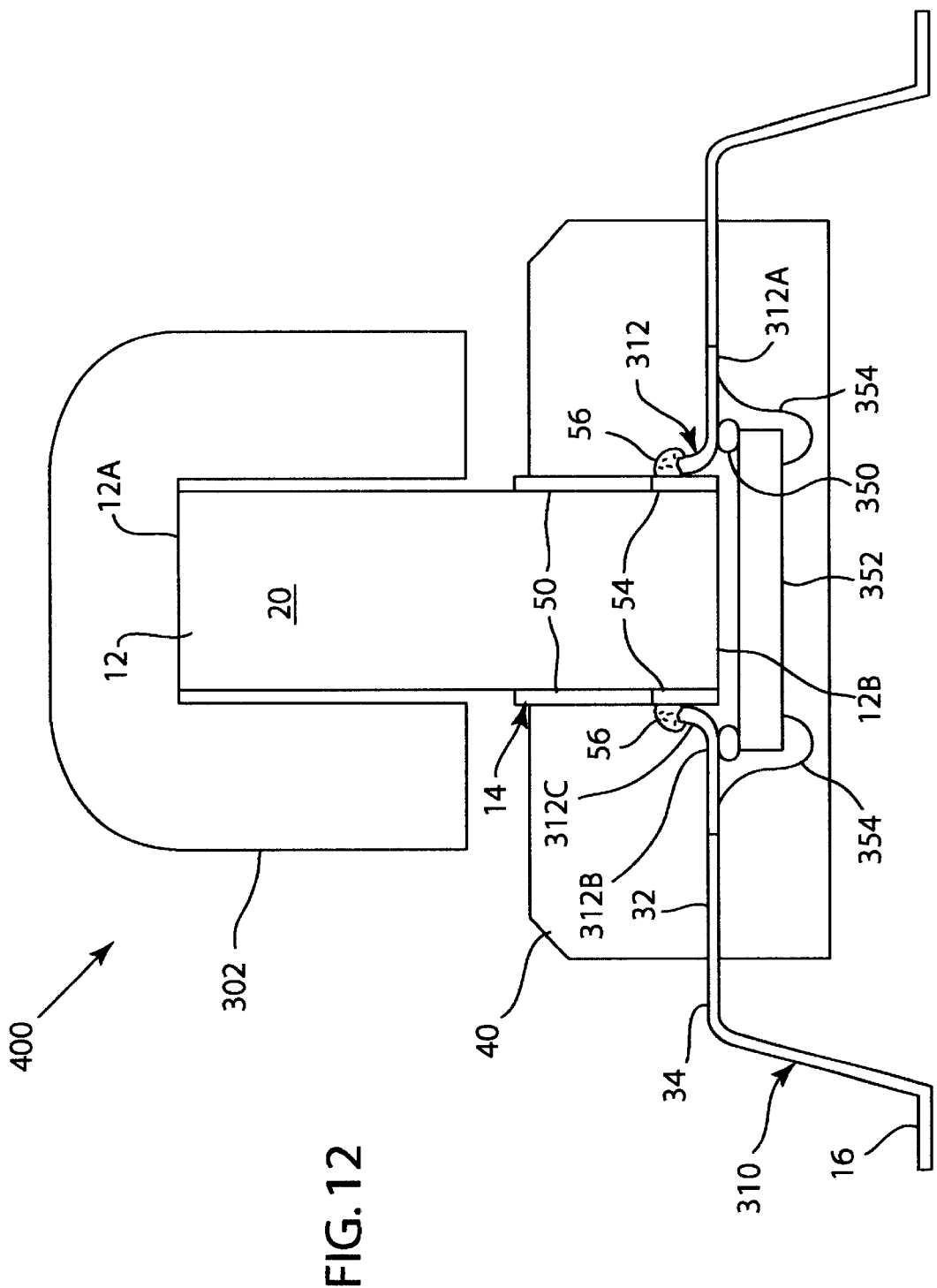
FIG. 12 is a side view of the surface-mount pointing stick.

Referring to FIG. 12, a surface-mount pointing stick having signal conditioning circuitry assembly 400 according to a further embodiment of the invention is illustrated, wherein like parts in the previous embodiment are represented by like numerals. FIG. 12 is identical to FIG. 10, except that adhesive 350 is only attached to inner leads 312 and is not attached to shaft end 12B. The die 352 is connected to leads 312 by adhesive 350.

Remarks About the Preferred Embodiments

One of ordinary skill in the arts of strain gages and ceramic materials, and more particularly the art of designing pointing sticks with strain gages on the sides, will realize many advantages from using the preferred embodiment. In particular, strain gages are devices that sense the amount and direction of applied pressure placed upon the pointing stick.

The sensed pressure creates electrical output signals used to direct the cursor on a display device. Thus, the side-mounted strain gages enables control of both the direction of cursor movement and the selection of items on the display device by tapping the pointing stick like the clicking of a mouse button. Of course, a skilled artisan will realize that the body 18 may have some flexure in a downward direction during the application of tapping force, especially with the cavity 44 arranged around the stick. Specifically, the flexing of the body 18 around the cavity will cause some force to be applied to the sensor from the top portion of the walls of the opening 46. However, the stick and sensor design can equally work without a cavity or flexure of the base side walls by simply sensing the strain created in the stick 12.

It will be noted that the collar 42 shifts the region of highest strain from the base 44 to the top of the collar 42 so that the maximum strain coincides with the resistor strips 50. With this arrangement, the entire length of the stick can be shortened. Specifically, when the stick 12 is shortened, there is a decrease in the amount of strain generated along the stick 12 when a person pushes the pointing stick with the finger. With the addition of the collar 42, the strain gauges 14 are now capable of sensing enough strain to be able to generate detectable and understandable electrical signals representative of the applied strain.

It is further noted that a skilled artisan would realize that the pointing device 10 is now capable of performing selection and dragging of icons on a monitor in addition to double clicking for selection of an item. In this operation, the user would hold down the pointing stick 12 while exerting additional force in the X-Y plane for controlling the direction of the icon being dragged. All of these functions are now capable of being performed with a single finger while the remaining fingers are located on the keyboard.

It can be seen that the embodiments of FIGS. 10 and 11, assembly 300 allow the signal conditioning circuitry to be mounted close to the resistors minimizing any coupled noise that may be introduced in the system and reducing shielding requirements. Further, the assembly 300, packages the signal processing circuitry into a more compact package than had been done previously.

The above-described embodiments can be constructed with the same dimensions and lead pitches as standard commercially available IC packages. The compact size would allow for its use in a wide variety of applications, while the minimal parts and ease of assembly of the above-described embodiments also renders the device relatively inexpensive to produce.

Variations of the Preferred Embodiment(s)

One of ordinary skill in the art of making pointing devices will realize that there are many different ways of accomplishing the preferred embodiment. For example, although the bonding compound 49 is illustrated between the body 18 and the stick 12, it may not be required when the opening 46 is sized to fit securely around the stick 12.

Even though the embodiments are discussed in conjunction with the use of strain gages on all four sides of the stick 12, it is contemplated that only two sides of the stick 12 can be used for sensing only either the positive or negative strain on the bending of the stick for creating the resulting control signals.

It is to be understood that the X, Y, and Z axes, as well as the terms upper, lower, etc., and their respective derivatives as used herein are intended to describe relative, rather than absolute directions and/or positions.

While the invention has been taught with specific reference to these embodiments, someone skilled in the art will recognize that changes can be made in form and detail without departing from the spirit and the scope of the invention. The describe embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A surface-mount pointing device for controlling the movement of an object on a display screen, comprising:

a) a base member;

b) a shaft having a first end and a second end, with the first end mounted in the base member;

c) a plurality of sensors, mounted around the shaft for sensing the amount of strain in the shaft that is created in response to an applied force on the shaft in at least a first direction, the sensors generating an electrical signal in response to the applied force;

d) a pair of spaced electrical leads disposed on opposing sides of the base member and extending at least partially through the base member, each electrical lead having a plurality of inner terminal ends electrically connected to at least one of the sensors, and a plurality of outer terminal ends extending outwardly of the base member and being shaped for mounting on the surface of a circuit board; and e) at least one electronic component, attached to the first end of the shaft and electrically connected to at least one of the inner terminal ends, the electronic component operable to receive the electrical signal from the sensors as an input and generate a conditioned electrical signal as an output.

2. The surface-mount pointing device according to claim 1, wherein the electronic component is attached to the first end of the shaft with an adhesive.

3. The surface-mount pointing device according to claim 2, wherein the electronic component is electrically connected to the inner terminal end by a wire bond extending from the inner terminal end to a wire bond pad.

4. The surface-mount pointing device according to claim 3, wherein the electronic component is enclosed within the base member.

5. The surface-mount pointing device according to claim 4, wherein the shape of the outer terminal ends is selected from the group consisting of:

a) gull-wing;

b) J-lead; or c) butt terminal.

6. The surface-mount pointing device according to claim 5, wherein a cap is located over the second end of the shaft.

7. The surface-mount pointing device according to claim 1, wherein the electronic component is attached to one of the electrical leads with an adhesive.

8. The surface-mount pointing device according to claim 1, wherein the electronic component is attached to one of the electrical leads with solder.

9. The surface-mount pointing device according to claim 2, wherein the electronic component is electrically connected to the inner terminal end by a solder joint.

* * * * *